United States Patent [19]
Groves

[11] 3,838,999
[45] Oct. 1, 1974

[54] METHOD AND APPARATUS FOR MELTING GLASS

[75] Inventor: Archie L. Groves, Allison Park, Pa.

[73] Assignee: PPG Industries, Inc., Pittsburgh, Pa.

[22] Filed: Jan. 30, 1973

[21] Appl. No.: 327,900

[52] U.S. Cl............................. 65/29, 65/161, 65/162, 65/DIG. 13
[51] Int. Cl................................................. C03b 5/24
[58] Field of Search .......... 65/161, 29, 162, DIG. 13

[56] References Cited
UNITED STATES PATENTS

| 2,081,595 | 5/1937 | McIntosh | 65/162 |
| 3,600,149 | 8/1971 | Chen et al. | 65/162 |
| 3,741,742 | 6/1973 | Jennings | 65/162 X |

Primary Examiner—Arthur D. Kellogg
Attorney, Agent, or Firm—E. Kears Pollock

[57] ABSTRACT

The operation of a regenerative glass melting furnace is controlled by regulating the fuel supply in accordance with the weighted average of readings from roof thermocouples in three or more locations in the melter, at least two of which are in the firing zone. A greater weight is given to changes in readings of thermocouples farther toward the exit end, but readings from thermocouples nearer to the feed end are not neglected. This makes it possible to narrow considerably the range of variation of temperature sensed by the thermocouple nearest to the exit end, with a corresponding improvement in the quality and/or yield of molten glass.

12 Claims, 3 Drawing Figures

METHOD AND APPARATUS FOR MELTING GLASS

BACKGROUND OF THE INVENTION

1. Field of the Invention:

This invention relates to the melting of glass, and in particular, to the melting of batch materials in a regenerative furnace for the production of glass, especially in an operation for the production of flat glass in large commercial quantities. The invention relates particularly to the control of the combustion of fuel, with the objective of achieving a particularly stable melting operation, thereby making it possible to improve the through-put and/or the yield of the glass-making operation.

2. Description of the Prior Art:

The melting of batch materials to produce soda-lime glass in large, commercial quantities (such as 100 to 700 tons per day) in a regenerative tank-type furnace has been practiced for at least 40 years. During most of that period, the practice as used for the control of combustion of fuel has been rather primitive and not particularly effective at yielding a stable operation, as will be discusssed below. For some purposes, the melting of glass for containers being an example, the achievement of stability is not a necessary part of the operation. If the glass that is produced does not need to exhibit optical properties (substantially distortion-free viewing when formed into pieces that are flat or nearly so), it is not disturbing that the temperatures at different locations in the melting tank vary from time to time, and as a result, changing convective currents develop within the molten glass that bring portions of glass of slightly different composition and correspondingly differing refractive index into admixture with one another in different ways, so that the molten glass that is withdrawn would be unsuitable for applications requiring such optical properties. In the flat-glass industry, however, such variations in the melting operation become a matter of concern. If the objective is to produce a piece of flat glass that is substantially free of distortion-producing differences in chemical composition and refractive index, considering one place in the glass as against another, it is apparent that it would be ideal to obtain a completely stable and steady-state melting operation. Commercial practice prior to the instant invention has been far short of such ideal.

Various difficulties tend to prevent the development of the desired stable operation. Furnace linings erode. The temperature of the air used to burn the natural gas that is commonly used changes with changes in the weather. The temperature of the batch materials fed similarly varies. There are variations in the moisture content of the batch material that is fed. The operation involves the use of high temperatures (about 2900° Fahrenheit in some portions of the furnace) and an oxidizing atmosphere; this makes it difficult to design elements of reasonable cost and adequate service life to sense the temperatures involved. Many of the available temperature-sensing elements of reasonable cost tend to give "noisy" signals. Moreover, the response of the system to changes in the amount of fuel fed is quite slow, being on the order of a few hours - that is, there is a large "dead time" in the system. Even if all the foregoing difficulties could be overcome, corrected, or allowed for, there are others that, as a practical matter, affect the process. Failures sometimes occur in the practice of "reversing the furnace", as discussed below; when a "reversal failure" occurs, the furnace may receive no fuel for a time on the order of 15 minutes. Moreover, feeders of batch or cullet may fail suddenly, making it necessary to feed the furnace all cullet or all batch. Because of these difficulties, those skilled in the art have not made much progress towards improving the stability of the melting operation.

Prior to the instant invention, the adjustment of the flow of natural gas or other fuel to the furnace was left to the judgment of the operator. It has been a common practice to provide thermocouples that are embedded in wells in the silica-brick roof of the melter portion of the furnace. A common practice, prior to the instant invention, was for the operator to read the temperature at a suitable one of such roof thermocouples and base his decision on that. Usually, one of the thermocouples in the vicinity of the last firing port was selected. The thermocouples farther upstream, i.e., near the feed end of the furnace, tended to be much more variable in their readings, and correspondingly less reliable as a guide for action. Even when a change was made, it might take two to five hours before its effect would be detected at the thermocouple in question. As a result, the operator checked the thermocouple in question at infrequent intervals, such as once every two or three hours. Such a prior-art practice sufficed to keep the temperature sensed by the thermocouple in question within a range of about 12° Fahrenheit. Of course, the variations in the temperature of the glass in the vicinity of the thermocouple were substantially larger.

It was recognized that such a practice was far from ideal, particularly in view of the large dead time, but roof-thermocouple readings from nearer to the feed end were not considered useful for purposes of determining how to adjust the flow of fuel. When glassbatch materials are added to a furnace of this kind, they tend to float on the surface of the molten glass, producing a "batch cover". Depending upon the melting conditions, the batch cover sometimes extends from side wall to side wall and from the feed end for 20 to 45 feet. The batch cover differs in its reflectivity from the uncovered molten glass. The batch cover prevents radiation from the molten glass from reaching the roof. Thus, though a roof thermocouple 30 feet from a feed end might (if viewing the molten glass) provide an earlier indication of the development of conditions indicating the desirability of the change in the rate of feeding fuel, there is the problem that its readings are quite unreliable as a guide to the temperature of the molten glass, since its readings are confounded by the effect of the batch cover. Moreover, at that location, the temperature of the molten glass is quite high, so that it is relatively expensive to obtain an indication of the temperature of the glass by other means, such as the use of a thermocouple immersed in the molten glass. Thus, the roof thermocouples that were located about 10 to 40 feet from the feed end were viewed as being useful almost entirely as means to ensure that the roof refractories were not exposed to temperatures too high.

Commercial demands make it necessary to change the width and/or thickness of the ribbon of glass being produced. From time to time, this also adds an element of instability.

In the flat-glass industry, increasing amounts of high-quality glass are made by the float process, wherein glass passes, after being melted and brought to the proper temperature, down a relatively narrow canal that contains a tweel to regulate the amount of glass flowing under it, and thence is poured onto a bath of molten tin or the like to form a ribbon of flat glass of desired dimensions. In the float process, it is especially desirable to control the temperature of the glass passing through the canal to a relatively narrow range, such as a difference (maximum to minimum) of 5° Fahrenheit. The glass in the canal is at a temperature where its viscosity changes substantially with temperature.

SUMMARY OF THE INVENTION

According to the invention, the yield and/or throughput of the process for melting glass batch materials to produce molten glass, particularly when the glass is to be used for flat-glass application, may be increased by conducting the melting under conditions that are closer to an ideal operation, in respect to the stability of the melting operation, than has been hitherto achieved. In particular, according to the invention, conditions within a glass melting furnace are sensed by at least two preferably three roof thermocouples, at least one of which is downstream of the zone where firing takes place, and when three are used at least two are preferably located within the zone where the firing takes place.

The inventive concept is such that advantages are obtained when the determination of the rate of feed of fuel to the furnace is made in accordance with the signals or readings a plurality of thermocouples, using an approach in which the rate of fuel feed or other heat supply is determined in accordance with a weighted combination of signals from such roof-thermocouples. The thermocouples that are farther downstream are given, in general, a greater weight in the combination. In this way, one gets a control signal that does not involve the use of additional or expensive temperature-sensing hardware and is, at the same time, somewhat more rapidly responsive to changes in the condition of the molten glass within the furnace than any other obtainable signal that has yet been suggested.

Those skilled in the arts of electrical engineering and automatic control will readily appreciate that process conditions are sensed and control actions are taken by methods operating upon signals in physical forms such as electric currents and voltages or pneumatic variations in gas streams. Despite this, it is common and accepted practice to refer to such processes and methods in mathematical terms, representative of the physical processes. The following discussion of this invention adopts this convention to facilitate an understanding of the invention but it is emphasized that the invention is directed to a controlled glass making process.

In a preferred embodiment, the contributions of the upstream two or more thermocouples to the control signal are determined by comparing a "current value" signal, computed by averaging the last twenty readings taken at one-minute intervals, with a "long-term average" signal, computed by algebraically adding 99.75 percent of the former "long-term average" signal to 0.25 percent of the present current value signal. In this embodiment, the circuitry associated with the thermocouple farthest downstream has an operator-controlled set point and an appropriate reset. Accordingly, there is provided a system wherein the concept of weighted averaging is used, but circumstances may arise wherein the weighted-average effect is overridden by the reset factor associated with the thermocouple most downstream. This arises most especially when the set point for the thermocouple most downstream has been sustantially changed or when there has been a relatively drastic change in other parameters that affect the process significantly. In accordance with the invention, it is possible, using relatively inexpensive hardware, to obtain a system with reasonable component service-life that substantially diminishes the variability of the glass temperature in the vicinity of the last firing port.

The invention is viewed as contributing substantially to the stability of the melting operation. With appropriate control circuitry, it is possible to adjust the demand set point for total gas or other fuels applied to the melting operation at fairly frequent intervals, on the order of once every minute, in comparison to making adjustments once every two hours or so in accordance with the prior art. It is also noteworthy that adopting the invention tends to diminish the frequency and severity of control problems with respect to the temperature of the glass at locations downstream of the last firing port, for example, in the refiner portion of the furnace and in the canal. To the extent that the instant invention contributes to the stability of the melting operation, it thus tends to improve the yield and/or the throughput of the process.

BRIEF DESCRIPTION OF THE DRAWINGS

A complete understanding of the invention may be obtained from the foregoing and following description thereof, taken in conjunction with the appended drawings, in which.

DESCRIPTION OF THE PREFERRED EMBODIMENTS

In the practice of the instant invention, it is necessary that there be a furnace for the melting of glass. It is contemplated, moreover, that the furnace be fired with hydrocarbon fuel, usually natural gas but also possibly fuel oil.

In its preferred embodiment this invention is employed to control a regenerative fired glass furnace. Those skilled in the art will understand that this refers to an apparatus and practice wherein there is a furnace on the order of 30 feet wide and 170 feet long, melting on the order of 300 to 450 tons per day. Raw batch materials are fed at one end of the glass making furnace. A firing zone extends for about 50 feet from the feed end of the furnace. Fuel is supplied to the furnace through spaced ports and the firing ports are spaced about 10 feet apart from one another, and in a furnace of the general size described above, used for the melting of glass at a rate on the order of 300 to 450 tons per day, there are five or six of such ports on each side of the furnace.

Along each side of the furnace are two manifolds, one for fuel and one for combustion air. The fuel manifold is simply a pipe extending along the length of the furnace. Extending from it at each port is a burner feed line, and connected to this line is a gas nozzle (or simply an appropriately sized pipe) which directs fuel into the port above and across the intended surface of molten glass in the furnace. The fuel manifold is provided with shut-off valves, a control valve and some flow indicator. The combustion air manifold is somewhat more elaborate. It is generally a refractory conduit or tunnel connected to each port and surrounding the burner feed lines. A section of the manifold is packed with refractory checker work, the importance of which is noted below. The air manifold is provided with an opening to the outside environment. A damper is positioned over this opening. When air is brought into the furnace through the manifold this damper is opened, otherwise it is closed. The air manifold is provided with a second opening connected to an exhaust stack. A damper is positioned over this opening. When air is brought into the furnace through the manifold, this damper is closed. When gaseous products of combustion and other waste or exhaust gases are discharged from the furnace through the manifold, the damper to the exhaust stack is open.

Fuel and air are supplied from manifolds to the furnace on one side thereof, and gases are concurrently withdrawn through the ports on the opposite side of the furnace, and this continues for a suitable period of time, such as about 10 minutes. The furnace is then "reversed". This means that fuel and air are supplied through the ports on the opposite side of the furnace and withdrawn from the side where the firing had previously been done. In either case, the exhaust gases are passed through refractory checker work that withdraws heat from the exhaust gases and accordingly becomes heated. When the furnace is reversed, ambient air that is intended to be used for combustion with the fuel is drawn through the heated checker work on that side of the furnace and thus brought to a high temperature. This increases the attainable flame temperature. In a furnace operating on the scale indicated above, it is customary to use natural gas at a supply rate in the vicinity of 90,000 to 120,000 standard cubic feet per hour. From experience with the prior-art modes of control, it is known that this total-gas feed rate should be changed by about 10 standard cubic feet per hour of natural gas for every degree Fahrenheit of difference between the observed roof-thermocouple temperature reading and the desired roofthermocouple temperature reading.

A plurality of thermocouples are positioned in the refractory blocks forming the roof of the furnace. In most commercial furnaces, these are already available, if for no reason other than to ensure against having the roof refractories become too hot and fail during service. It is customary for the roof thermocouples to be provided in spaced locations that correspond, in general, to the locations of the various firing ports. The firing ports are usually numbered from the feed end, and in a furnace having five ports, it would be usual to find at least five roof thermocouples, so that it would be possible to select one that is in the vicinity of the last port or, preferably, somewhat downstream thereof, and two others that are near it, being about 10 and 20 feet upstream of it. These are the thermocouples that it would be preferable to use in accordance with the invention. Those skilled in the art will appreciate how greater numbers of thermocouples, or thermocouples that are somewhat differently located, might also be used.

The furnace roof is usually made of silica brick. The roof thermocouples are inserted into wells that are drilled into the silica brick. A certain thickness of refractory is generally provided between the hot junction of the thermocouple and headspace of the furnace. This thickness is preferably from ¼ to ½ inch. It is desirable, moreover, in most instances, not to permit the hot junction of the thermocouple to come into contact with the silica brick. A small space is provided between the hot junction of the thermocouple and the surface of the silica brick forming the interior of the thermocouple well. When the hot junction of a thermocouple is permitted to come into contact with the interior of the thermocouple, the service life of the thermocouple usually is severely shortened.

In a broad aspect, the invention concerns establishing a setpoint for the total gas flow rate in accordance with the weighted average of the readings or signals of a plurality of thermocouples. As an example, thermocouples may be located as follows - a first one 40 feet from the feed end, a second one 50 feet from the feed end, and a third one 60 feet from the feed end of the furnace -- it is possible to calculate a weighted temperature average, giving weights of 10 percent to the first one and 30 percent to the second, and 60 percent to the third. Signal averaging circuits are used which are familiar to engineers of ordinary skill in the art of control. The output signals of the thermocouples will, of course, be in millivolts. These signals are converted, using conventional standards, techniques and circuits for the kind of thermocouple junction involved, to corresponding temperatures in degrees Fahrenheit or other suitable scale.

Thus, in a broad aspect, the instant invention does not necessarily relate to any closed-loop control of the feeding of fuel to a glass melting furnace. In this broadest aspect, all that is essential is that multiple thermocouples be used and that greater weight be placed upon the readings from the thermocouples that are farther downstream. In most instances, the downstream thermocouples will be more reliable in their readings. It is thus possible to operate a glass melting furnace with a greater degree of control and a closer approach to the ideal of a stable and a steady-state melting operation than has been achieved in accordance with prior practices. It is understood that observations of thermocouple signals and appropriate combinations thereof for the adjustment of fuel flow are to be made on a reasonably frequent basis, such as once every 15 minutes, if not more frequently. It is, of course, very much more desirable to make adjustments in total fuel feed rate on a very frequent basis, such as once every minute or once every 16 seconds. It is also within the scope of the invention to do this by means of suitable automatic equipment. This mode of control may be characterized as open-loop control.

In accordance with a somewhat narrower and more preferred mode of practicing the instant invention, use is made of a closed-loop system wherein temperature readings from the thermocouples in question are taken on a frequent basis, such as once every minute, and the rate of total gas feed is correspondingly frequently adjusted. With the use of a system of this kind, it should be possible to control the melting operation well enough that the thermocouple readings for thermocouples at the last firing port (or within about 10 feet downstream thereof) do not vary by more than something like 7° to 9° Fahrenheit. This can be compared with having that value vary through a range of 12 Fahrenheit in accordance with prior-art methods, or through about 10 Fahrenheit for the open-loop system discussed above.

The weighting of the thermocouple readings may vary somewhat from the example (10-30-60) mentioned above. Weightings somewhat more nearly even may be used, such as 15-25-60, 15-30-55, 20-30-50, 20-35-45, or 25-35-40. To the extent that the upstream thermocouples are given greater weight, the system is thus operated on the basis of conditions that are sensed as being present nearer to the feed end, so that the sensitivity of the control (in terms of achieving a relatively more rapid response to changes in conditions) is accordingly improved. At the same time, it is desirable to maintain a considerable weight for the thermocouple farthest downstream, partly to ensure the reliability of the response and partly to prevent the response from being too sluggish in the event of a considerable step-change in set point at that location, e.g., when it is desirable to change the total throughput considerably because of a change in width and/or thickness of the desired product ribbon.

The invention as discussed above is illustrated in schematic form in the attached drawings.

Figure 1:
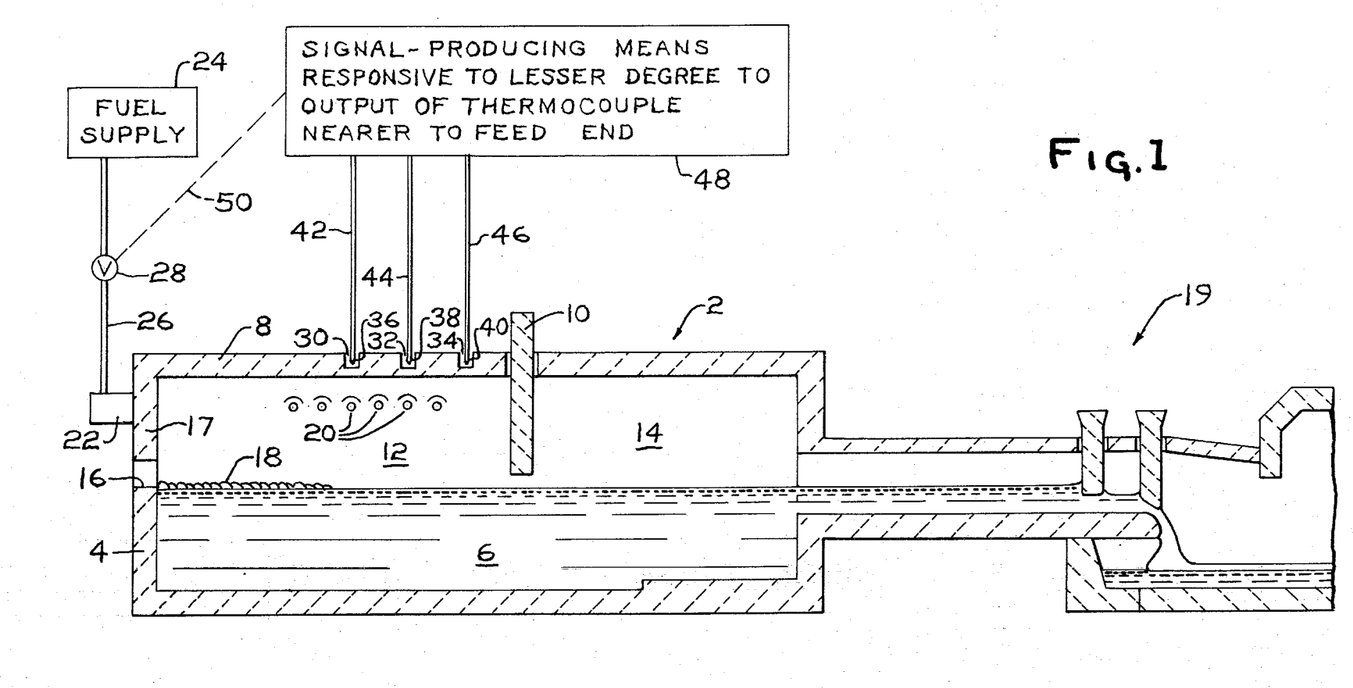
FIG. 1 is a schematic sectional elevation view of a tank for melting flat glass, indicating also auxiliary equipment that is provided in accordance with the instant invention.

In FIG. 1 there is shown a schematic sectional elevation of a glass furnace 2, such as is used for the melting of batch materials in the production of glass. Such a furnace or tank comprises a basin 4 containing molten glass 6, and a roof 8. A drop arch or shadow wall, indicated at 10, serves to divide the melter portion 12 from the refiner portion 14 of the furnace. The furnace also has a port 16, usually in its end wall 17, through which batch materials such as sand, soda, lime, and etc., are fed. These materials are lighter than the molten glass 6, and they can float on the surface of the molten glass, as indicated at 18. Connected to the glass furnace 2 is a conventional float canal and float glass forming chamber 19.

The tank 2 also has in its melter section 12 a plurality of ports 20, through which the fuel is supplied to the furnace 12, for example, from a header 22 (only one end of which is visible in FIG. 1) fed from the fuel supply 24 through line 26 containing a valve 28.

Provided in the roof 8 of the tank, there are wells 30, 32 and 34, within which there are set appropriate thermocouples 36, 38, and 40, respectively. The thermocouples 36, 38 and 40 convey signals by means of lines 42, 44, and 46, respectively, to a signal-producing means 48. As FIG. 1 indicates, the signal-producing means, which generally is a sensitive voltmeter, is responsive to a lesser degree to the output of one or more thermocouples that are nearer to the feeding end of the tank, i.e., nearer to the port 16. Because of variations that occur in the operation, the thermocouples nearer to the feed end, such as the thermocouples 36 and 38, sometimes yield signals that are relatively less reliable as an indication of the conditions in the furnace than the signals from the thermocouple 40, because the batch cover 18 sometimes extends sufficiently far down the tank, i.e. away from the port 16 and the feed end, so as to interfere with the radiation of heat from the molten glass 6 to the roof 8.

It will be seen that the thermocouples 36 and 38 are located in a portion of the roof 8 within the firing zone defined by the firing ports 20 whereas the thermocouple 40 is downstream of and outside of that zone. The signals from thermocouple 40 alone, although sufficiently stable to permit their use as a basis for control, have been found to be too slowly responsive to changing furnace conditions to provide a truly satisfactory mode of control. In other words, the indication of the thermocouple 40 indicates the condition of the furnace perhaps 10 to 15 minutes ago, and if a change is made in the fuel supply rate in accordance with such indications, a correspondingly long time is required before a corresponding response is seen in the indications or signals produced by the thermocouple 40.

As indicated at 50, the signal-producing means 48 is operatively connected to the valve 28 in the fuel-supply line 26. Preferably, the means 48 adjusts the setting of a valve 28 at frequent intervals, such as once every minute. The adjusting means 48 may be a pneumatic driven valve or an electric motor driven valve connected to a holding current output station. This contrasts sharply with the prior art practice of adjusting the fuel-supply rate at infrequent intervals, such as once an hour or less frequently.

Figure 2:
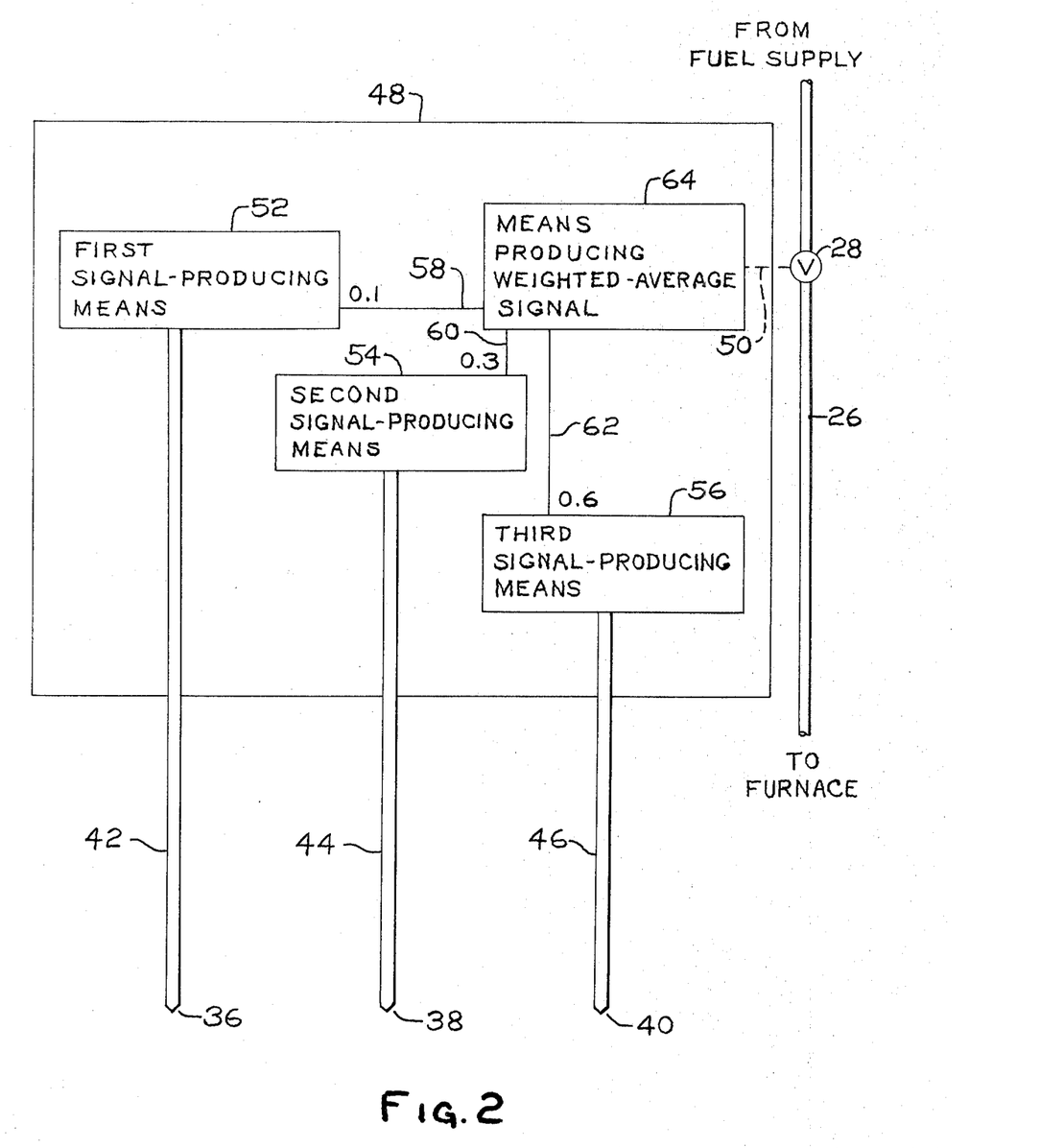
FIG. 2 is a schematic diagram showing with greater detail a portion of the equipment indicated in FIG. 1, in accordance with a preferred embodiment of the instant invention.

In FIG. 2, there is shown one particular mode of practicing the invention. It is indicated that each of the thermocouples 36, 38 and 40 have associated with it a first, second, or third signal-producing means 52, 54, or 56, respectively. The means 52, 54 and 56 transmit signals through lines 58, 60, and 62 respectively, to a means 64 for producing a weighted-average signal. As one example, it is indicated that the means 52 produces a signal that is given a weight of 0.1 or 10 percent; the means 54 is given a weight of 0.3 or 30 percent; and the means 56 is given a weight of 0.6 or 60 percent. As before, the means 64 is operatively connected, as at 50, to the valve 28.

The invention as described above is, of course, indicated schematically. Each side of the furnace has ports 20, a header 22, and an appropriate connection to the fuel-supply 24. It is a matter of choice whether there is only a single valve 28, with appropriate plumbing to direct the fuel to the desired side of the furnace, or there are separate valves 28 for the separate sides of the furnace. In either case, the present invention operates in the same way to control the rate of fuel supply in accordance with the outputs of the roof thermocouples.

Figure 3:
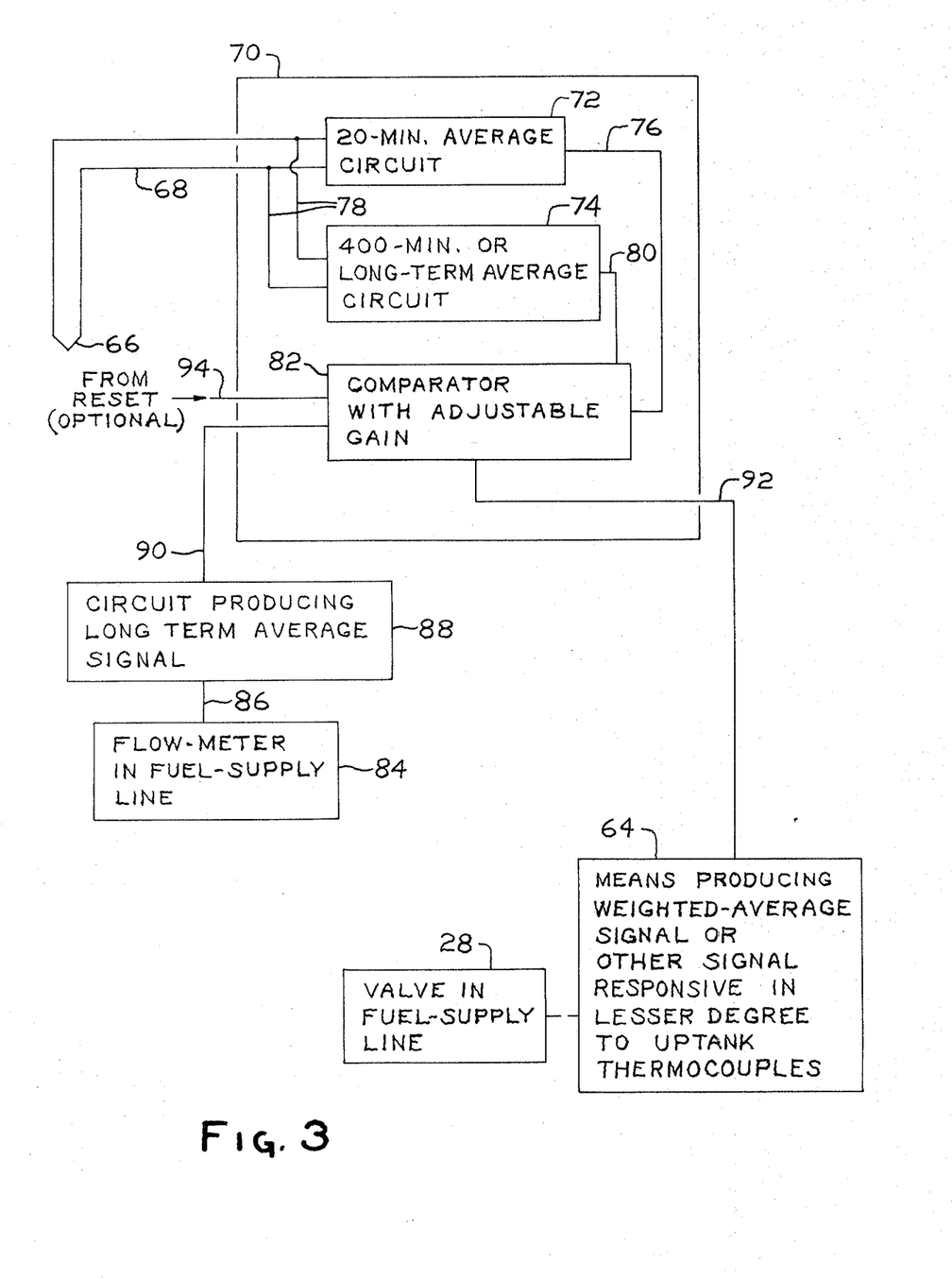
FIG. 3 is a further detailed schematic diagram, explaining the operation of certain components depicted in FIG. 2.

In FIG. 3, there is indicated in somewhat greater detail a preferable mode of effecting the control discussed in connection with FIG. 2. A thermocouple 66 directs signals through a line 68 to a signal-producing means 78. The thermocouple 66 may be considered as one of the thermocouples 36. 38 or 40. The signal-producing means 70 may be considered as one of the means 52, 54, or 56. As shown, the means 70 comprises two circuits 72 and 74 to which the indications from the thermocouple 66 are directed. Circuit 72 is indicated as being a "20-minute average" circuit. A conventional electronic averaging circuit is used to sample the output of the thermocouple at 1-minute intervals and to produce a signal that is essentially the average of the readings for the most recent 20 minutes. The time interval is, of course, a matter of choice. Moreover, the concept of rejecting sample readings that are outside a particular band of values, or of taking them into account only to the extent of a certain limiting value, it may be applied, in an effort to achieve a closer control by disregarding "spikes" or other disturbances in the output of the thermocouple 66. A conventional, adjustable band width, electronic filter is employed. The circuit 72 produces on line 56 a signal that is, in effect, an indication of the current or present value of the temperature sensed by the thermocouple 66.

The circuit 74, which receives signals from the thermocouple 66 through line 78, is indicated to be a "400-minute or long-term average" circuit. Once again, the period to be used is a matter of choice, but the idea is to obtain a signal that is responsive to changes in furnace conditions to some extent, while not tending to vary to an undesired extent. The output of the circuit 74 is fed through a line 80 to a conventional comparator circuit 82.

A flow meter 84 is provided in the fuel-supply line 26, and it produces on line 86 a signal indicating the fuel feed-rate. The signals on line 86 are fed to a circuit 88 which produces a long-term average signal on line 90, which also leads to the comparator 82.

In accordance with one desirable mode of control, if the value of the signal on line 76 equals that on line 80, the comparator 82 emits on line 92 a signal corresponding to the long-term average signal produced on line 90. If the signal on line 76 indicates that the temperature sensed by the thermocouple 66 in the last 20 minutes has been higher than the long-term average, the output signal on line 92 is decreased from the signal on line 90 by an appropriate percentage, depending upon a preset gain of the comparator 82. Similarly, if the value of the signal on line 76 indicates that in the last 20 minutes that the thermocouple 66 has been sensing a temperature that is below the corresponding value on line 80, i.e., the furnace is getting colder, the signal on line 92 is then increased by an appropriate amount.

In one preferable mode of control, the means 52 and 54 (see FIG 2) are operated in the manner discussed above, and the means 56 is like the means 70, except that the comparator 82 receives on line 94 a reset signal that may be produced in any desired or suitable manner, such as by manually adjusting a potentiometer or rheostat connected to the comparator circuit. The reset may be changed from time to time to adjust the desired temperature detected by the thermocouple 40.

As those skilled in the art will appreciate, the means 64 may yield the desired effect of producing a signal that is influenced by a greater degree by the changes in the readings of the thermocouple 40 than by changes in the readings of the thermocouple 36, in any of several different ways. If, for example, the gain chosen for the comparator 82 in means 52 and 54 is lower than the gain in the comparator 82 of the means 56, it may not be necessary to put weights, such as 10 percent, 30 percent and 60 percent on the individual signals that come through the lines 92 to the means 64. In that case, even if they are weighted equally, the differences in gain alone may be such as to produce the desired selectivity or preferentiality in the output of means 64. On the other hand, if the gains in the comparator 82 of the three means 52, 54 and 56 are all equal, it is quite possible to achieve the desired control by using the means 64 in a circuit that affords the desired weighting.

A system as shown and described is considered to afford a remarkable improvement in the operation of a float line, tending to make it relatively easy to hold the roof-thermocouple temperature somewhat downstream of the last firing port within a satisfactorily narrow range, such as less than 5°F. This decreases the variability of temperatures farther along in the process of melting and forming the glass, and thus tends to improve the quality and/or throughput of the product flat glass.

By practicing the present invention, it is possible to operate a glass furnace at constant throughput while using one to two percent less fuel than in conventional practice. Intermittant and occassional overheating with its consequent fuel waste is avoided by decreasing temperature and fuel use variations to a narrow band about the minimum glass temperature and fuel use consistent with making high quality glass.

While I have described herein certain embodiments of my invention, I intend to cover as well any change or modification therein that may be made without departing from their spirit and scope.

I claim:

1. In an apparatus for making glass comprising a furnace for receiving raw materials, for containing them and for containing molten glass formed from them, said furnace including a furnace roof spaced over said raw materials and molten glass, means for firing said furnace with fuel to melt said raw materials to form molten glass wherein unmelted raw materials cover a portion of said molten glass formed therefrom, which portion may vary, the improvement comprising:
    a. at least two temperature sensing means positioned in said furnace roof and disposed one from the other along the intended path for molten glass flow through said furnace, at least one temperature sensing means being in a portion of said roof over a portion of molten glass where said unmelted raw materials can extend and at least one temperature sensing means in a portion of said roof, over molten glass that is substantially never covered by unmelted raw materials, and
    b. means, responsive to both of said temperature sensing means, for controlling the flow of fuel to said furnace, said control means being more responsive to said temperature sensing means over molten glass that is substantially never covered by unmelted raw materials than to said other temperature sensing means.

2. The apparatus according to claim 1 wherein a plurality of temperature sensing means are provided in said roof over a portion of said molten glass where said unmelted raw materials can extend and wherein means are provided for combining signals from said plurality of temperature sensing means to cause an average signal therefrom to act upon said control means.

3. The apparatus according to claim 1 wherein the apparatus comprises a regenerative furnace.

4. In an apparatus for making glass comprising a furnace for receiving raw materials, for containing them and for containing molten glass formed from them, said furnace including a furnace roof spaced over said raw materials and molten glass, an upstream firing zone and a downstream zone, means for firing said furnace with fuel to melt said raw materials to form molten glass within the firing zone, wherein unmelted raw materials cover a portion of said molten glass formed therefrom, which portion may vary, the improvement comprising:

a. at least two temperature sensing means positioned in said furnace roof, at least one temperature sensing means being in a portion of said roof in said firing zone and at least one temperature sensing means being in a portion of said roof in said downstream zone; and
b. means, responsive to both of said temperature sensing means for controlling the flow of fuel to said furnace, said control means being more responsive to said downstream zone temperaure sensing means that to said firing zone temperature sensing means.

5. The apparatus according to claim 4 wherein the apparatus comprises a regenerative furnace. temperature 6. In a combination comprising a regenerative furnace, including means for firing said furnace of hydrocarbon fuel, said furnace being adapted to melt raw materials and form soda-lime glass, the improvement comprising:
a. first, second, and third temperature-sensing means positioned in a refractory material forming a roof of said furnace, said first, second, and third temperature-sensing means being positioned, respectively, first, second, and third locations that are respectively, a location spaced from said first location toward the exit end of the furnace, and a location spaced from said second location and toward the exit end of the furnace, at least said first and second locations being within a zone of firing of said furnace;
b. signal-producing means responsive to the outputs of each of said first, second, and third temperature-sensing means, said signal-producing means being responsive to the output of said first temperature-sensing means to a lesser degree than to at least one of said second and third temperature-sensing means; and
c. means, responsive to said signal-producing means, for controlling the rate of hydrocarbon fuel supply to said furnace.

7. A combination as defined in claim 6, further characterized in that said signal-producing means is responsive to greater degree to the output of said third temperature-sensing means than to the output of said first temperature-sensing means in that said signal-producing means comprises means for generating a weighted average of the signals of said first, second, and third temperature-sensing means, greater weight in said average being accorded to said third temperature-sensing means than to said first temperature-sensing means.

8. A combination as defined in claim 6, characterized in that said signal-producing means is responsive to a greater degree to the output of said third temperature-sensing means than to the output of said first temperature-sensing means, said third temperature-sensing means having a higher gain than said first temperature-sensing means.

9. A combination as defined in claim 6 further characterized in that said signal-producing means comprises means for operating continually so as to adjust the rate of hydrocarbon fuel supply at frequent intervals on the order of once every ten seconds to once every thirty minutes.

10. In melting raw materials to make glass in a glass making furnace by firing the furnace with hydrocarbon fuel, the practice of:
a. sensing roof-refractory temperatures at first, second and third locations that are, respectively, a location nearest to the feed end of the furnace, a location spaced from said first location toward the exit end of the furnace, at a location spaced from said second location toward the exit end of the furnace, at least said first and second locations being within a zone of firing of said furnace,
b. generating a signal dependent upon the values of the temperatures determined at said first, second, and third locations, said signal being responsive to a substantially greater degree to the temperature at said third location than to the temperature at said first location, and
c. adjusting the rate of supply of hydrocarbon fuel to said furnace in accordance with the value of said signal.

11. A method as defined in claim 10 further characterized in that said signal-producing means is responsive to a greater degree to the output of said third temperature-sensing means than to the output of said first temperature-sensing means in that said signal-producing means comprises means for generating a weighted average signal from the signals of said first, second and third temperature-sensing means, greater weight in said average being accorded to said third-temperature-sensing means than to said first temperature-sensing means.

12. A method as defined in claim 10, further characterized in that said signal-producing means operates continually so as to adjust the rate of hydrocarbon fuel supply at frequent intervals on the order of once every ten seconds to once every thirty minutes.

* * * * *

UNITED STATES PATENT OFFICE
CERTIFICATE OF CORRECTION

Patent No. 3838999　　　　　　　　　　　Dated October 1, 1974

Inventor(s) Archie L. Groves

It is certified that error appears in the above-identified patent and that said Letters Patent are hereby corrected as shown below:

Claim 5, column 11, line 16, following "furnace." delete the word "temperature".

Signed and sealed this 31st day of December 1974.

(SEAL)
Attest:

McCOY M. GIBSON JR.　　　　　　　　C. MARSHALL DANN
Attesting Officer　　　　　　　　　　Commissioner of Patents